United States Patent
Endo et al.

(10) Patent No.: US 8,366,819 B2
(45) Date of Patent: Feb. 5, 2013

(54) OILY INKJET INK

(75) Inventors: Toshihiro Endo, Ibaraki-ken (JP); Marie Morinaga, Ibaraki-ken (JP); Naoyuki Torita, Ibaraki-ken (JP)

(73) Assignee: Riso Kagaku Corporation (JP)

( * ) Notice: Subject to any disclaimer, the term of this patent is extended or adjusted under 35 U.S.C. 154(b) by 0 days.

(21) Appl. No.: 12/979,901

(22) Filed: Dec. 28, 2010

(65) Prior Publication Data

US 2011/0232528 A1    Sep. 29, 2011

(30) Foreign Application Priority Data

Mar. 25, 2010    (JP) ................. 2010-070234

(51) Int. Cl.
*C09D 11/02*    (2006.01)

(52) U.S. Cl. ................... 106/31.86; 106/31.6

(58) Field of Classification Search .......... 106/31.6, 106/31.86

See application file for complete search history.

(56) References Cited

U.S. PATENT DOCUMENTS

| | | | |
|---|---|---|---|
| 7,060,125 B2 * | 6/2006 | Ohkawa et al. | 106/31.57 |
| 7,393,400 B2 * | 7/2008 | Kitawaki et al. | 106/31.86 |
| 7,799,123 B2 | 9/2010 | Endo et al. | |
| 2003/0063172 A1 | 4/2003 | Ohtsu et al. | |
| 2003/0177948 A1 * | 9/2003 | Ohkawa et al. | 106/31.86 |
| 2007/0022904 A1 * | 2/2007 | Kitawaki et al. | 106/31.86 |
| 2007/0101901 A1 * | 5/2007 | Endo et al. | 106/31.86 |

FOREIGN PATENT DOCUMENTS

JP    2008-274034 A    11/2008

* cited by examiner

*Primary Examiner* — Melvin C Mayes
*Assistant Examiner* — Veronica F Faison
(74) *Attorney, Agent, or Firm* — Studebaker & Brackett PC; Donald R. Studebaker

(57) ABSTRACT

An oily inkjet ink comprises a pigment, a dispersant, and a water-insoluble organic solvent, wherein an ester solvent contained in the water-insoluble organic solvent is an ester solvent that is represented by the general formula: $C_nH_x$—COO—$C_mH_{2m+1}$, in which n represents an integral number falling within the range of 8 to 15, m represents an integral number falling within the range of 4 to 7, and x represents a number falling within the range of 2n−1 to 2n+1. The ester solvent is contained in a containing quantity falling within the range of 10% by mass to 30% by mass with respect to the total quantity of the ink.

6 Claims, No Drawings

OILY INKJET INK

BACKGROUND OF THE INVENTION

1. Field of the Invention

This invention relates to an oily inkjet ink. This invention particularly relates to an oily inkjet ink, which has a good aptitude for inkjet and a good aptitude for toners, and which is free from the risk that an uncomfortable alcoholic odor will be given out from printed paper after image formation (after printing).

2. Description of the Related Art

Inkjet recording systems are the systems in which an inkjet ink having a high degree of fluidity is jetted out in the form of ink droplets from fine head nozzles, and in which an image is recorded by the ink droplets on printing paper located so as to stand facing the nozzles. Recently, the inkjet recording systems have rapidly become popular for the possibility of high speed printing with low noise. As the inks for use in the inkjet recording systems, there have been proposed various oily inkjet inks, which contain a water-insoluble solvent and a pigment finely dispersed in the water-insoluble solvent.

For example, in U.S. Pat. No. 7,799,123, the inventors proposed an ink, which contains a non-polar solvent, such as an ester solvent, a higher alcohol solvent, or a hydrocarbon solvent, and a pigment dispersed in the non-polar solvent. The proposed ink has the advantages in that the ink has excellent on-printer stability and a good aptitude for inkjet, and in that the ink yields a printed surface, which does not adhere to a print surface having been printed with a plain paper copier or a laser printer when being superimposed upon the print surface. The proposed ink thus has a good aptitude for toners.

With regard to the inkjet printing, the problems of odors are often encountered. Examples of the odors include an odor due to a residual monomer in a UV ink (as described in U.S. Patent Application Publication No. 20030063172) and an odor due to a solvent contained in a non-aqueous ink in which a printing medium is vinyl chloride (as described in Japanese Unexamined Patent Publication No. 2008-274034). However, with respect to oily inks used ordinarily, before now, problems of odors have not been reported.

However, recently, as for the inkjet printing using an ordinary oily ink which does not contain a specific substance that will be the cause of the odor as described above, the problems have occurred in that an uncomfortable odor is given out from the printed paper after image formation. The inventors have eagerly conducted research and have found that, of calcium compounds, such as calcium carbonate, calcium hydroxide, and calcium oxide, which are contained in paper, calcium hydroxide, which is susceptible to extraction by water and which has a high pH value, causes the problems of the odor to occur. Specifically, the inventors have found that calcium hydroxide contained in the printing paper has the effect of a catalyst upon ester solvents widely used in ordinary inks, e.g. isononyl isononanoate and isooctyl palmitate, hydrolyzes the ester solvents to generate alcohols having the uncomfortable odor, and thus causes the problems of the odor to occur. The present invention is based upon the findings described above.

SUMMARY OF THE INVENTION

The primary object of the present invention is to provide an oily inkjet ink, which has a good aptitude for inkjet and a good aptitude for toners, and which is free from the risk that an uncomfortable alcoholic odor will be given out from printed paper after image formation.

The present invention provides an oily inkjet ink, comprising a pigment, a dispersant, and a water-insoluble organic solvent, wherein an ester solvent contained in the water-insoluble organic solvent is an ester solvent that is represented by the general formula:

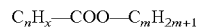

$$C_nH_x\text{—}COO\text{—}C_mH_{2m+1}$$

in which n represents an integral number falling within the range of 8 to 15, m represents an integral number falling within the range of 4 to 7, and x represents a number falling within the range of $2n-1$ to $2n+1$, the ester solvent being contained in a containing quantity falling within the range of 10% by mass to 30% by mass with respect to the total quantity of the ink.

The definitions of n, m, and x will hereinbelow be omitted.

The oily inkjet ink in accordance with the present invention should preferably be modified such that m in the general formula representing the ester solvent represents the integral number of 6.

In such cases, the oily inkjet ink in accordance with the present invention should more preferably be modified such that the ester solvent is hexyl laurate and/or hexyl myristate.

Also, the oily inkjet ink in accordance with the present invention should preferably be modified such that the ink further comprises an alcohol solvent in which the number of carbon atoms falls within the range of 12 to 20. In such cases, the oily inkjet ink in accordance with the present invention should preferably be modified such that the alcohol solvent is contained in a containing quantity falling within the range of 3% by mass to 15% by mass with respect to the total quantity of the ink.

The oily inkjet ink in accordance with the present invention comprises the pigment, the dispersant, and the water-insoluble organic solvent, wherein the ester solvent contained in the water-insoluble organic solvent is the ester solvent that is represented by the general formula:

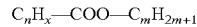

$$C_nH_x\text{—}COO\text{—}C_mH_{2m+1}$$

the ester solvent being contained in the containing quantity falling within the range of 10% by mass to 30% by mass with respect to the total quantity of the ink.

Therefore, the oily inkjet ink in accordance with the present invention has a good aptitude for inkjet and a good aptitude for toners and is free from the risk that, in cases where calcium hydroxide is contained in the printing paper, an uncomfortable alcoholic odor will be given out from the printed paper after image formation.

DETAILED DESCRIPTION OF THE INVENTION

The oily inkjet ink (hereinbelow referred to simply as the ink) in accordance with the present invention is characterized by comprising the pigment, the dispersant, and the water-insoluble organic solvent, wherein the ester solvent contained in the water-insoluble organic solvent is the ester solvent that is represented by the general formula:

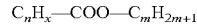

$$C_nH_x\text{—}COO\text{—}C_mH_{2m+1}$$

the ester solvent being contained in the containing quantity falling within the range of 10% by mass to 30% by mass with respect to the total quantity of the ink.

In the general formula shown above, n represents an integral number falling within the range of 8 to 15, m represents an integral number falling within the range of 4 to 7, and x represents a number falling within the range of 2n−1 to 2n+1. If m represents a number smaller than 4, since volatility of an alcohol generated by hydrolysis will be high, the quantity of the alcohol retaining in the printing paper will be small, and the odor from the printed paper will not much be perceived. However, in such cases, dissolving characteristics of the ester solvent with respect to the toner will become high, and the problems will occur in that the paper having been printed with the toner becomes sticky. If m represents a number larger than 7, since the volatility of the alcohol generated by the hydrolysis will be low, the quantity of the alcohol retaining in the printing paper will be large, and the uncomfortable alcoholic odor from the printed paper will be much perceived.

In cases where m in the general formula shown above represents an integral number falling within the range of 4 to 7, if n represents a number smaller than 8, the volatility of the ester solvent itself will become high, and the odor of the ester itself will become strong. Also, the ink viscosity in the vicinity of the head nozzles will increase as the volatilization of the ester solvent proceeds, and it will not always be possible to obtain a good aptitude for inkjet. Further, the dissolving characteristics with respect to the toner will become high. If n represents a number larger than 15, the viscosity of the ester solvent will become high, and therefore it will not always be possible to obtain a good aptitude for inkjet.

In the general formula shown above, each of the moiety $C_nH_x$ and the moiety $C_mH_{2m+1}$ may be of a straight chain or of a branched chain.

More specifically, examples of the ester solvents will be described hereinbelow. Examples of the ester solvents represented by the aforesaid general formula, in which m represents an integral number of 4, include butyl nonanoate, butyl caprate, butyl undecanoate, butyl laurate, butyl tridecanoate, butyl myristate, butyl pentadecylate, butyl palmitate, butyl isononanoate, butyl isocaprate, butyl isoundecanoate, butyl isolaurate, butyl isotridecanoate, butyl isomyristate, butyl isopentadecylate, butyl isopalmitate, isobutyl nonanoate, isobutyl caprate, isobutyl undecanoate, isobutyl laurate, isobutyl tridecanoate, isobutyl myristate, isobutyl pentadecylate, isobutyl palmitate, isobutyl isononanoate, isobutyl isocaprate, isobutyl isoundecanoate, isobutyl isolaurate, isobutyl isotridecanoate, isobutyl isomyristate, isobutyl isopentadecylate, isobutyl isopalmitate, butyl myristoleate, butyl palmitoleate, isobutyl myristoleate, and isobutyl palmitoleate.

Examples of the ester solvents represented by the aforesaid general formula, in which m represents an integral number of 5, include pentyl nonanoate, pentyl caprate, pentyl undecanoate, pentyl laurate, pentyl tridecanoate, pentyl myristate, pentyl pentadecylate, pentyl palmitate, pentyl isononanoate, pentyl isocaprate, pentyl isoundecanoate, pentyl isolaurate, pentyl isotridecanoate, pentyl isomyristate, pentyl isopentadecylate, pentyl isopalmitate, isopentyl nonanoate, isopentyl caprate, isopentyl undecanoate, isopentyl laurate, isopentyl tridecanoate, isopentyl myristate, isopentyl pentadecylate, isopentyl palmitate, isopentyl isononanoate, isopentyl isocaprate, isopentyl isoundecanoate, isopentyl isolaurate, isopentyl isotridecanoate, isopentyl isomyristate, isopentyl isopentadecylate, isopentyl isopalmitate, pentyl myristoleate, pentyl palmitoleate, isopentyl myristoleate, and isopentyl palmitoleate.

Examples of the ester solvents represented by the aforesaid general formula, in which m represents an integral number of 6, include hexyl nonanoate, hexyl caprate, hexyl undecanoate, hexyl laurate, hexyl tridecanoate, hexyl myristate, hexyl pentadecylate, hexyl palmitate, hexyl isononanoate, hexyl isocaprate, hexyl isoundecanoate, hexyl isolaurate, hexyl isotridecanoate, hexyl isomyristate, hexyl isopentadecylate, hexyl isopalmitate, isohexyl nonanoate, isohexyl caprate, isohexyl undecanoate, isohexyl laurate, isohexyl tridecanoate, isohexyl myristate, isohexyl pentadecylate, isohexyl palmitate, isohexyl isononanoate, isohexyl isocaprate, isohexyl isoundecanoate, isohexyl isolaurate, isohexyl isotridecanoate, isohexyl isomyristate, isohexyl isopentadecylate, isohexyl isopalmitate, hexyl myristoleate, hexyl palmitoleate, isohexyl myristoleate, and isohexyl palmitoleate.

Examples of the ester solvents represented by the aforesaid general formula, in which m represents an integral number of 7, include heptyl nonanoate, heptyl caprate, heptyl undecanoate, heptyl laurate, heptyl tridecanoate, heptyl myristate, heptyl pentadecylate, heptyl palmitate, heptyl isononanoate, heptyl isocaprate, heptyl isoundecanoate, heptyl isolaurate, heptyl isotridecanoate, heptyl isomyristate, heptyl isopentadecylate, heptyl isopalmitate, isoheptyl nonanoate, isoheptyl caprate, isoheptyl undecanoate, isoheptyl laurate, isoheptyl tridecanoate, isoheptyl myristate, isoheptyl pentadecylate, isoheptyl palmitate, isoheptyl isononanoate, isoheptyl isocaprate, isoheptyl isoundecanoate, isoheptyl isolaurate, isoheptyl isotridecanoate, isoheptyl isomyristate, isoheptyl isopentadecylate, isoheptyl isopalmitate, heptyl myristoleate, heptyl palmitoleate, isoheptyl myristoleate, and isoheptyl palmitoleate.

Each of the above-enumerated ester solvents may be used alone. Alternatively, two or more of the above-enumerated ester solvents may be used in combination. Among the above-enumerated ester solvents, the ester solvents represented by the aforesaid general formula, in which m represents an integral number of 6, are preferable. Hexyl laurate and hexyl myristate are more preferable.

The containing quantity of the ester solvent falls within the range of 10% by mass to 30% by mass with respect to the total quantity of the ink. If the containing quantity of the ester solvent is smaller than 10% by mass, the aptitude for inkjet will become bad. If the containing quantity of the ester solvent is larger than 30% by mass, even though m in the aforesaid general formula represents an integral number falling within the range of 4 to 7, and even though n in the aforesaid general formula represents an integral number falling within the range of 8 to 15, the odor uncomfortableness will be aggravated.

It is preferable that all of the ester solvent contained in the water-insoluble organic solvent is the ester solvent that is represented by the aforesaid general formula. However, in so far as the uncomfortable alcoholic odor is not given out, an ester solvent other than the ester solvent that is represented by the aforesaid general formula may be contained in the water-insoluble organic solvent.

Examples of the ester solvents other than the ester solvent that is represented by the aforesaid general formula include ethyl laurate, isononyl isononanoate, isopropyl laurate, isopropyl myristate, isopropyl palmitate, isooctyl palmitate, isostearyl palmitate, isopropyl oleate, butyl oleate, isobutyl linoleate, isopropyl isostearate, isobutyl soybean oil, isobutyl tallate, diisopropyl adipate, diisopropyl sebacate, propylene glycol monocaprate, triethylhexyl citrate, and glyceryl tri-2-ethylhexanoate.

The oily inkjet ink in accordance with the present invention should preferably be modified such that the alcohol solvent in which the number of carbon atoms falls within the range of 12 to 20 is used in combination with the water-insoluble organic solvent. In cases where the alcohol solvent described above is used in combination with the water-insoluble organic solvent, the aptitude for inkjet is enhanced even further. If the number of carbon atoms in the alcohol solvent is smaller than 12, the compatibility with the ester solvent and a non-polar solvent will become bad. If the number of carbon atoms in the alcohol solvent is larger than 20, the ink viscosity will become high, and the ink jetting-out performance will become bad.

Examples of the alcohol solvents in which the number of carbon atoms falls within the range of 12 to 20 include isomyristyl alcohol, isopalmityl alcohol, isostearyl alcohol, isoeicosyl alcohol, and oleyl alcohol. The containing quantity of the alcohol solvent should preferably fall within the range of 3% by mass to 15% by mass with respect to the total quantity of the ink. If the containing quantity of the alcohol solvent is smaller than 3% by mass, the aptitude for inkjet will become bad. If the containing quantity of the alcohol solvent is larger than 15% by mass, the ink viscosity will become high, and the ink jetting-out performance will become bad.

Besides the ester solvent that is represented by the aforesaid general formula, and the alcohol solvent, the ink in accordance with the present invention may also contain pigments, dispersants, the other solvents and, if necessary, various additives.

No limitation is imposed upon the pigments, which may be used in the ink in accordance with the present invention. It is possible to use inorganic pigments and organic pigments, which are already known. Examples of the inorganic pigments include titanium oxide, iron oxide red, cobalt blue, ultramarine, Prussian blue, carbon black, calcium carbonate, kaolin, clay, barium sulfate, talc, and silica. Examples of the organic pigments include insoluble azo pigments, azo lake pigments, condensed azo pigments, condensed polycyclic pigments, and copper phthalocyanine pigments. Each of the above-enumerated pigments may be used alone. Alternatively, two or more of the above-enumerated pigments may be used in combination. The adding quantity of the pigment should preferably fall within the range of 0.5% by mass to 20% by mass with respect to the total quantity of the ink.

Examples of the pigment dispersants include hydroxyl group-containing carboxylic acid esters, salts of long-chain polyaminoamides and polymeric acid esters, salts of polymeric polycarboxylic acids, salts of long-chain polyaminoamides and polar acid esters, polymeric unsaturated acid esters, modified polyurethanes, modified polyacrylates, polyether ester type anionic surface active agents, naphthalenesulfonic acid-formalin condensate salts, polyoxyethylene alkyl phosphoric acid esters, polyoxyethylene nonyl phenyl ethers, polyester polyamines, and stearylamine acetate.

Among the above-enumerated dispersants, the polymer type dispersants are used preferably. Examples of the polymer type dispersants include the dispersants commercially available under the following trade names: Solsperse 5000 (a phthalocyanine ammonium salt type), Solsperse 11200 (a polyamide type), Solsperse 13940 (a polyester amine type), Solsperse 17000, Solsperse 18000 (a fatty acid amine type), Solsperse 22000, Solsperse 24000, and Solsperse 28000 (each of which is manufactured by The Lubrizol Corporation); Efka 400, Efka 401, Efka 402, Efka 403, Efka 450, Efka 451, Efka 453 (a modified polyacrylate), Efka 46, Efka 47, Efka 48, Efka 49, Efka 4010, and Efka 4055 (a modified polyurethane) (each of which is manufactured by EFKA Chemicals B.V.); Demol P, Demol EP, Poiz 520, Poiz 521, Poiz 530, and Homogenol L-18 (a polycarboxylic acid type polymeric surface active agent) (each of which is manufactured by Kao Corp.); Disparon KS-860 and Disparon KS-873N4 (an amine salt of a polymeric polyester) (each of which is manufactured by Kusumoto Chemicals, Ltd.); Discole 202, Discole 206, Discole OA-202, and Discole OA-600 (a poly-chain polymeric nonionic type) (each of which is manufactured by Dai-ichi Kogyo Seiyaku Co., Ltd.); and Antaron V216 (a vinylpyrrolidone-hexadecene copolymer) (manufactured by ISP Japan Ltd.). Among the above-enumerated polymer type dispersants, the polyamide type and the vinylpyrrolidone-hexadecene copolymer are more preferable. The containing quantity of the dispersant may be such that the pigment described above can be dispersed sufficiently in the ink. Ordinarily, the containing quantity of the dispersant may fall within the range of approximately 1% by mass to approximately 7% by mass.

Besides the ester solvent that is represented by the aforesaid general formula, the ink solvent may also contain a non-polar organic solvent, a polar organic solvent, or a mixture of the non-polar organic solvent and the polar organic solvent. Particularly, the non-polar organic solvent should preferably be used in combination with the ester solvent. In cases where the non-polar organic solvent is used in combination with the ester solvent, the suppression of the odor generation becomes more efficient, and the jetting-out performance becomes good. The containing quantities of the non-polar organic solvent and the polar organic solvent with respect to the total solvent quantity should preferably be such that the containing quantity of the non-polar organic solvent falls within the range of 20% by mass to 80% by mass, and the containing quantity of the polar organic solvent falls within the range of 80% by mass to 20% by mass. The containing quantities of the non-polar organic solvent and the polar organic solvent with respect to the total solvent quantity should more preferably be such that the containing quantity of the non-polar organic solvent falls within the range of 30% by mass to 80% by mass, and the containing quantity of the polar organic solvent falls within the range of 70% by mass to 20% by mass. The containing quantities of the non-polar organic solvent and the polar organic solvent with respect to the total solvent quantity should most preferably be such that the containing quantity of the non-polar organic solvent falls within the range of 40% by mass to 80% by mass, and the containing quantity of the polar organic solvent falls within the range of 60% by mass to 20% by mass.

Examples of the non-polar organic solvents include aliphatic hydrocarbon solvents, alicyclic hydrocarbon solvents, and aromatic hydrocarbon solvents. Examples of the aliphatic hydrocarbon solvents and the alicyclic hydrocarbon solvents include paraffin type solvents, isoparaffin type solvents, and naphthene type solvents. Specifically, examples of the paraffin type solvents, isoparaffin type solvents, and naphthene type solvents include the solvents commercially available under the following trade names: Teclean N-16, Teclean N-20, Teclean N-22, Nisseki Naphtesol L, Nisseki Naphtesol M, Nisseki Naphtesol H, Solvent 0 L, Solvent 0 M, Solvent 0 H, Nisseki Isosol 300, Nisseki Isosol 400, AF-4, AF-5, AF-6, and AF-7 (each of which is manufactured by Nippon Oil Corporation); and Isopar G, Isopar H, Isopar L, Isopar M, Exxol D40, Exxol D80, Exxol D100, Exxol D130, and Exxol D140 (each of which is manufactured by Exxon Mobil Corporation). Examples of the aromatic hydrocarbon solvents include the solvents commercially available under the trade names of Nisseki Cleansol G (alkyl benzene) (manufactured by Nippon Oil Corporation) and Solvesso 200 (manufactured by Exxon Mobil Corporation). Among the above-enumerated solvents, the naphthene type solvents, AF-4, AF-5, AF-6, and AF-7 (trade names) are widely used.

As the polar organic solvents, besides the ester solvent that is represented by the aforesaid general formula, and the alcohol solvent described above, it is possible to use higher fatty acid type solvents and ether type solvents. Examples of the higher fatty acid type solvents include isononanoic acid, isomyristic acid, hexadecanoic acid, isopalmitic acid, oleic acid, and isostearic acid. Examples of the ether type solvents include diethylene glycol monobutyl ethers, ethylene glycol monobutyl ethers, propylene glycol monobutyl ethers, and propylene glycol dibutyl ethers.

In addition to the ingredients described above, the ink in accordance with the present invention may also contain ordinarily used additives. Examples of the additives include surface active agents, such as anionic, cationic, amphoteric, and nonionic surface active agents; and antioxidants, such as dibutyl hydroxy toluene, propyl gallate, tocopherol, butylhydroxyanisole, and nordihydroguaiaretic acid.

The ink in accordance with the present invention may be prepared by processing, wherein all ingredients are introduced collectively or in lots into a known dispersing machine, such as a bead mill, and subjected to a dispersing process, and wherein, if necessary, the resulting dispersion is passed through a known filtering machine, such as a membrane filter. Specifically, the ink in accordance with the present invention may be prepared by the processing, wherein apart of the solvent and the entire quantities of the pigment and the dispersant are mixed uniformly, wherein the thus prepared mixture is subjected to the dispersing process by use of the dispersing machine, wherein the balance of the ingredients is added to the thus prepared dispersion, and wherein the resulting mixture is passed through the filtering machine.

EXAMPLES

The present invention will further be illustrated by the following non-limitative examples.
(Preparation of Ink)
Raw materials were premixed in accordance with each of formulations shown in Table 1 below. (Values shown in Table 1 are expressed in terms of parts by mass.) Thereafter, the resulting mixture was subjected to a dispersing process for approximately 10 minutes in a bead mill. In this manner, each of inks in Examples 1 to 6 and Comparative Examples 1 to 7 was prepared.
(Evaluation)
(Odor)
Each of the inks prepared in Examples 1 to 6 and Comparative Examples 1 to 7 was introduced into an inkjet printer "ORPHIS X9050" (trade name, manufactured by Riso Kagaku Corporation), and a solid image was printed on each of 20 sheets of plain paper (trade name: Copy & Laser, manufactured by April Paper Company). At the stage immediately after the printing (at the stage within five minutes after the printing), i.e. at the stage before the hydrolysis of the ester solvent proceeded, three panelists were allowed to smell the odor of the tenth sheet of the printed paper. Functional evaluation was made in accordance with the criterion shown below.

Also, the printed paper was stored at the room temperature for two weeks after the printing. At the stage after the printed paper was thus stored, i.e. at the stage after the hydrolysis of the ester solvent proceeded, the three panelists were allowed to smell the odor of the tenth sheet of the printed paper. The functional evaluation was made in accordance with the criterion shown below.
  ○: An uncomfortable odor was not perceptible.
  Δ: A slight odor was perceptible.
  x: An uncomfortable odor was perceptible.
(Aptitude for Toners)
Each of the inks prepared in Examples 1 to 6 and Comparative Examples 1 to 7 was introduced into the inkjet printer "ORPHIS X9050," and a solid image was printed on each of sheets of the plain paper (trade name: Copy & Laser, manufactured by April Paper Company). The sheets of the printed paper were superimposed one upon another such that the printed surfaces of the sheets of the printed paper stood facing each other and were left to stand under a 30° C. environment for one month. The sheets of the printed paper superimposed one upon another were then separated from one another, and stains of the printed surfaces were observed visually. The results of the visual observation were evaluated in accordance with the criterion shown below.
  ○: Stains of the printed surfaces were not perceptible.
  Δ: Slight stains of the printed surfaces were perceptible, but were allowable.
  x: The toner transferred to the inkjet printed surfaces, and stains of the printed surfaces were perceptible.
(Aptitude for Inkjet)
Each of the inks prepared in Examples 1 to 6 and Comparative Examples 1 to 7 was introduced into the inkjet printer "ORPHIS X9050" and was stored in this state under a 30° C. environment for six months. Strong cleaning, which was one of functions of ORPHIS X9050, was then performed one time, and an A3 solid image was printed on each of 50 sheets of printing paper. Each of the sheets of the printed paper was then observed, and the number of jetting-out failure nozzles (the number of white lines) was counted. The printing on the 50 sheets of the printing paper was repeated 200 times (i.e., the printing was performed on 10,000 sheets in total). The jetting-out performance was evaluated in accordance with the criterion shown below.
  ○: The number of jetting-out failure nozzles were at most 5 per 10,000 sheets.
  Δ: The number of jetting-out failure nozzles fell within the range of 6 to 19 per 10,000 sheets.
  x: The number of jetting-out failure nozzles were at least 20 per 10,000 sheets.
Table 1 shows the formulation of each ink and the results of the evaluation.

TABLE 1

|  |  |  | Example | | | | | |
|---|---|---|---|---|---|---|---|---|
|  |  | m/n | 1 | 2 | 3 | 4 | 5 | 6 |
| Coloring material | Carbon black |  | 10 | 10 | 10 | 10 | 10 | 10 |
| Dispersant | Solsperse 13940 |  | 5 | 5 | 5 | 5 | 5 | 5 |
| Ester solvent | Propyl myristate | 3/13 |  |  |  |  |  |  |
|  | Butyl myristate | 4/13 | 20 |  |  |  |  |  |
|  | Hexyl laurate | 6/11 |  | 20 |  | 10 | 30 | 30 |
|  | Isooctyl laurate | 8/11 |  |  |  |  |  |  |
|  | Isononyl isononanoate | 9/8 |  |  |  |  |  |  |
|  | Hexyl caprylate | 6/7 |  |  |  |  |  |  |
|  | Hexyl myristate | 6/13 |  |  |  | 20 |  |  |
|  | Hexyl stearate | 6/17 |  |  |  |  |  |  |

TABLE 1-continued

| | | | | | | | | |
|---|---|---|---|---|---|---|---|---|
| Alcohol | Isomyristyl alcohol | | 10 | 10 | 10 | 10 | 10 | 0 |
| Hydrocarbon | AF-5 | | 55 | 55 | 55 | 65 | 45 | 55 |
| Total | | | 100 | 100 | 100 | 100 | 100 | 100 |
| Odor | Two weeks after printing (*1) | | ○ | ○ | ○ | ○ | Δ | Δ |
| | Immediately after printing (*2) | | ○ | ○ | ○ | ○ | ○ | ○ |
| | Aptitude for toners | | Δ | ○ | ○ | ○ | ○ | ○ |
| | Aptitude for inkjet | | Δ | ○ | ○ | Δ | ○ | Δ |

| | | | Comparative Example | | | | | | |
|---|---|---|---|---|---|---|---|---|---|
| | | m/n | 1 | 2 | 3 | 4 | 5 | 6 | 7 |
| Coloring material | Carbon black | | 10 | 10 | 10 | 10 | 10 | 10 | 10 |
| Dispersant | Solsperse 13940 | | 5 | 5 | 5 | 5 | 5 | 5 | 5 |
| Ester solvent | Propyl myristate | 3/13 | | | | | 20 | | |
| | Butyl myristate | 4/13 | | | | | | | |
| | Hexyl laurate | 6/11 | 40 | 5 | | | | | |
| | Isooctyl laurate | 8/11 | | | 20 | | | | |
| | Isononyl isononanoate | 9/8 | | | | 20 | | | |
| | Hexyl caprylate | 6/7 | | | | | | 20 | |
| | Hexyl myristate | 6/13 | | | | | | | |
| | Hexyl stearate | 6/17 | | | | | | | 20 |
| Alcohol | Isomyristyl alcohol | | 10 | 10 | 10 | 10 | 10 | 10 | 10 |
| Hydrocarbon | AF-5 | | 35 | 70 | 55 | 55 | 55 | 55 | 55 |
| Total | | | 100 | 100 | 100 | 100 | 100 | 100 | 100 |
| Odor | Two weeks after printing (*1) | | x | ○ | x | x | Δ | x | ○ |
| | Immediately after printing (*2) | | ○ | ○ | ○ | ○ | Δ | x | ○ |
| | Aptitude for toners | | Δ | ○ | ○ | ○ | x | x | ○ |
| | Aptitude for inkjet | | ○ | x | ○ | ○ | Δ | x | x |

(*1): (After hydrolysis has proceeded)
(*2): (Before hydrolysis proceeds)

As shown in Table 1, as for each of the inks prepared in Examples 1 to 6 in accordance with the present invention, in which the ester solvent represented by the aforesaid general formula was used, an odor was not perceptible even at the stage of two weeks after the printing. As for each of the inks prepared in Examples 5 and 6, though a slight odor was perceptible, the extent of the odor fell within the allowable range. Also, the aptitude for toners and the aptitude for inkjet of each of the inks prepared in Examples 1 to 6 were of the extents free from practical problems. As for each of the inks prepared in Examples 2 and 3, the odor, the aptitude for toners, and the aptitude for inkjet were good. It was thus found that each of the inks prepared in Examples 2 and 3 was an excelling inkjet ink.

Further, the aptitude for inkjet of the ink prepared in Example 5 was better than the aptitude for inkjet of the ink prepared in Example 6. In cases where the volatility of the ink solvent was taken into consideration, the ink prepared in Example 5 would be more susceptible to volatilization than the ink prepared in Example 6. However, since the aptitude for inkjet of the ink prepared in Example 5 was better than the aptitude for inkjet of the ink prepared in Example 6, it was considered that the alcohol solvent used together with the water-insoluble organic solvent had the good effect upon the aptitude for inkjet.

Furthermore, even in cases where the ester solvent represented by the aforesaid general formula was used, with the ink prepared in Comparative Example 1, in which the containing quantity of the ester solvent was large, the odor was perceptible markedly. Also, with the ink prepared in Comparative Example 2, in which the containing quantity of the ester solvent was small, the aptitude for inkjet was bad. Further, in cases where isooctyl laurate or isononyl isononanoate represented by the aforesaid general formula, in which m represented a number of at least 8, was used as in Comparative Example 3 or 4, the uncomfortable odor was perceived markedly at the stage of two weeks after the printing. Furthermore, in cases where propyl myristate represented by the aforesaid general formula, in which m represented an integral number of 3, was used as in Comparative Example 5, since the volatility of an alcohol generated by the hydrolysis was high, the quantity of the alcohol retaining in the printing paper was small, and the odor from the printed paper was not much perceived. However, in such cases, the dissolving characteristics of the ester solvent with respect to the toner were high, and the problems occurred in that the paper having been printed with the toner became sticky.

As for the ink prepared in Comparative Example 6, in which m in the general formula shown above represented an integral number of 6, but in which n in the general formula shown above represented a number smaller than 8, the volatility of the ester solvent itself became high, and the odor of the ester itself was perceptible at the stage immediately after the printing. Also, in such cases, the ink viscosity increased as the volatilization of the ester solvent proceeded, and it was difficult to obtain a good aptitude for inkjet. Further, in such cases, the dissolving characteristics with respect to the toner were high, and it was difficult to obtain a good aptitude for toners. As for the ink prepared in Comparative Example 7, in which m in the general formula shown above represented an integral number of 6, but in which n in the general formula shown above represented an integral number of as large as 17, the viscosity of the ester solvent became high, and therefore it was difficult to obtain a good aptitude for inkjet.

What is claimed is:

1. An oily inkjet ink, comprising a pigment, a dispersant, and a water-insoluble organic solvent, wherein the water-insoluble organic solvent contains an ester solvent that is represented by the general formula:

$$C_nH_x-COO-C_mH_{2m+1}$$

in which n represents an integral number falling within the range of 8 to 13, m represents an integral number falling within the range of 4 to 7, and x represents a number falling within the range of $2n-1$ to $2n+1$, the ester solvent being contained in a containing quantity falling within the range of 10% by mass to 30% by mass with respect to the total quantity of the ink and ester solvents other than the ester solvent represented by the general formula not being contained.

2. An oily inkjet ink, as defined in claim 1, wherein the ester solvent is contained in the range of 10% by mass to 20% by mass with respect to the total quantity of the ink.

3. An oily inkjet ink, as defined in claim 1, wherein m represents an integral number of 6 in the general formula of the ester solvent.

4. An oily inkjet ink, as defined in claim 3, wherein the ester solvent is hexyl laurate and/or hexyl myristate.

5. An oily inkjet ink, as defined in claim 1, wherein an alcohol solvent is contained in a containing quantity falling within the range of 3% by mass to 15% by mass with respect to the total quantity of the ink.

6. An oily inkjet ink, as defined in claim 5, wherein a non-polar solvent is contained in a containing quantity falling within the range of 20% by mass to 80% by mass with respect to the total quantity of the solvent.

* * * * *